Dec. 7, 1943.   D. D. DUTTER   2,336,000
PRESSURE SYSTEM
Filed July 20, 1942
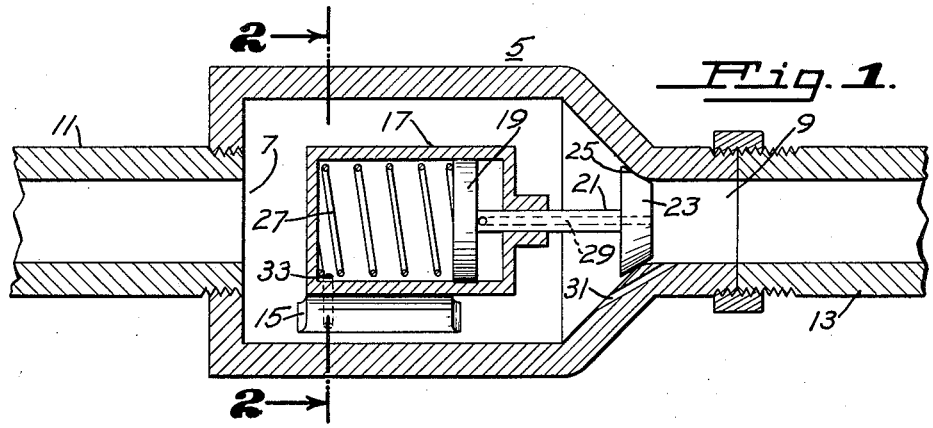
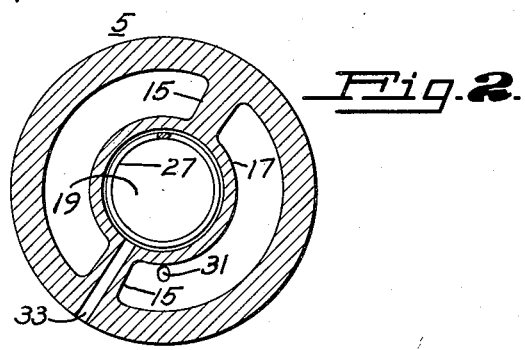
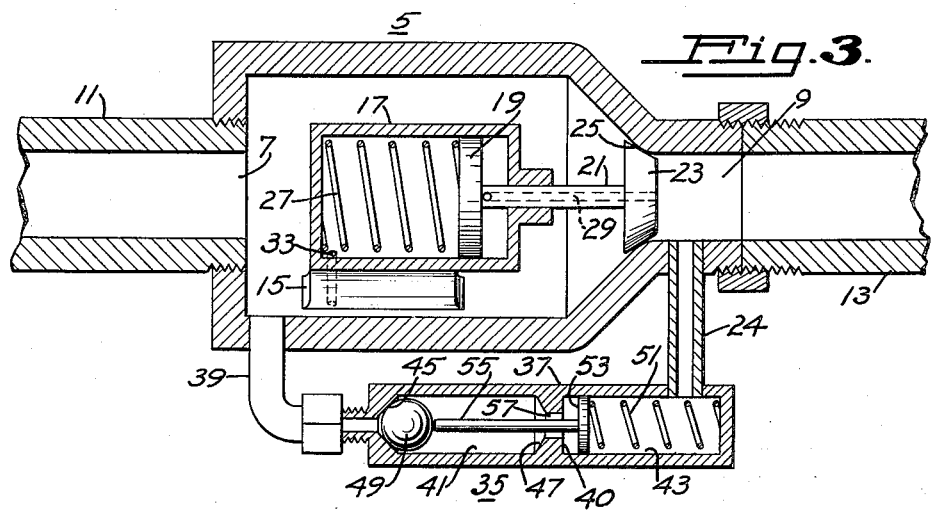
INVENTOR.
DONALD D. DUTTER.
BY
Lippincott & Metcalf
ATTORNEYS.

Patented Dec. 7, 1943

2,336,000

UNITED STATES PATENT OFFICE 2,336,000

PRESSURE SYSTEM

Donald D. Dutter, Big Creek, Calif.

Application July 20, 1942, Serial No. 451,587

5 Claims. (Cl. 303—84)

My invention relates to pressure systems, and more particularly to a check valve assembly for use in such systems to check or inhibit loss of fluid in the event of a leak or break.

Among the objects of my invention are: To provide a new and improved check valve assembly for fluid pressure systems; to provide new and improved check valve assembly for use in fluid pressure systems in which the valve is open only during existence of normal operating pressures in such systems; to provide new and improved check valve assembly operative in a fluid pressure system to preclude loss of pressure fluid through leaks or breaks in such systems; to provide new and improved check valve assembly for fluid pressure systems of intermittent pressure type in which the valve assembly normally blocks flow of fluid pressure in such systems until such pressure reaches a predetermined minimum value; to provide new and improved check valve assembly for fluid pressure systems of the continuous pressure type; to provide new and improved check valve assembly for fluid pressure systems of the continuous pressure type to forestall loss of pressure and fluid in the event of a leak or a break in such systems; to provide a novel and improved protecting arrangement for fluid pressure systems of either the intermittent or continuous pressure type; and to provide a novel and improved combination of valve and fluid pressure systems for the maintenance of pressure in such systems in spite of a leak or break therein. Additional objects of my invention will be brought out in the following description of the same taken in conjunction with the accompanying drawing wherein:

Fig. 1 is a view in section of a check valve assembly of my invention as employed in a hydraulic system.

Fig. 2 is a view in section taken on the line 2—2 of Fig. 1.

Fig. 3 is a view similar to Fig. 1 but depicting a modification of the assembly of that figure.

Referring to Fig. 1 of the drawing for a complete and detailed description of one embodiment of my invention, the two sections of pipe or tubing represent portions of a pressure system and more particularly a feeder or branch line of such system wherein pressure either exists continuously or where pressure may be developed intermittently as in the hydraulic brake system of an automotive vehicle.

My improved check valve assembly is applicable to either type of system, but inasmuch as its mode of operation differs slightly, depending on the type of system in which it is installed, it will first be described in its application to a system wherein pressures are developed intermittently as in the aforementioned hydraulic brake system of an automotive vehicle.

The valve assembly comprises a main housing 5 having an inlet opening 7 at one end and a discharge opening 9 at the other end, permitting the assembly to be connected into the main line or a branch line of a pressure system. With reference to the valve assembly, that portion 11 of the pressure system connected to the inlet opening 7 of the valve assembly housing may be referred to as the upstream side, and that portion 13 connected to the discharge end of the housing may be referred to as the downstream side of the system.

Concentrically supported from the inner wall of the housing by a plurality of radially disposed webs 15, is a cylinder 17. This cylinder carries a piston 19 having a stem 21 extending through one end of the cylinder in the direction of the discharge opening 9 in the housing and terminating in a valve 23 at the end of the stem. The discharge end of the housing is tapered to provide a valve seat 25 for this valve, the valve being normally urged into seating position by a compression spring 27 located within the cylinder and bearing against the upstream side of the piston.

The valve stem 21 is provided with an axial bore 29 establishing communication between the interior of the cylinder 17 and the downstream side of the system, and a pilot opening 31 in the housing serves to by-pass the valve 23 while in its seated position. Inasmuch as the webs 15 do not block the free flow of fluid through the valve housing, as clearly indicated in Fig. 1, the pilot opening 31 during the seating of the valve 23, serves to maintain a continuous fluid connection between the upstream and the downstream sides of the system. While such communication is restricted by the pilot opening, as to flow of fluid through the valve housing under these conditions, it nevertheless serves to permit transmission of pressure from the upstream side of the system through the valve housing to the downstream side of the system. Thus, when pressure is developed on the upstream side, as when applying pressure to the brake pedal in a hydraulic brake system, full unit pressure is promptly established throughout the system, including the transmission of such pressure against both sides of the valve 23, as well as the downstream side of the piston 19 by way of the bore 29 in the valve stem 21. The total pressure against the piston and the downstream side of the valve is in a direction tending to open the valve, while the total pressure against the upstream side of the valve is in a direction to seat the same. Inasmuch as the combined area of the piston plus that of the downstream side of the valve is in excess of that of the upstream side of the valve, the valve will unseat in response to the differential pressure created under these conditions. When this occurs full fluid communication is established through the valve housing between the upstream and downstream side of the pressure line.

A bleeder opening 33 through one of the webs and connecting the interior of the cylinder on the upstream side of the piston with the atmosphere, permits the cylinder to "breathe" in response to movements of the piston as the valve is unseated and seated, thereby facilitating the reciprocation of the piston in its cylinder.

To better understand the operation of my improved valve assembly, let us assume that a substantial leak occurs in the downstream side of the line in which the valve assembly is connected, while the brake is on. Pressure on the downstream side of the valve will drop causing the valve to immediately close. Loss of fluid is thus prevented except for such fluid as may by-pass the valve through the pilot opening 31. With a pilot opening of minimum diameter, such slight loss can be tolerated.

Even this slight fluid loss can be avoided, if desired, with the embodiment of my invention illustrated in Fig. 3. In this embodiment I employ a check valve by-pass assembly 35 to take the place of the pilot opening 31 in the embodiment of Fig. 1.

This check valve by-pass assembly may take the form of a narrow, cylindrical valve housing 37, preferably having one end connected by an elbow 39 to the main valve housing 5 at some point upstream from the main valve 23 and a connection 24 from the opposite end to a point in the discharge end of the main valve housing on the downstream side of the main valve 23. The by-pass check valve housing 37 is divided into two chambers by a partition 40. One of these chambers constitutes a ball check valve chamber 41 while the other constitutes a spring retaining chamber 43. The ball check valve chamber 41 is tapered at each end to provide a valve seat 45 and 47 respectively at each end of the chamber for a ball valve 49 located therein. The spring retaining chamber 43 houses a compression coil spring 51 which bears against a piston 53 having a stem 55 extending therefrom into the ball valve chamber through a perforation 57 in the partition 40, and engaging the ball valve 49.

The piston should either be of a diameter to provide clearance with the wall of the chamber 43, or if of substantially the same diameter as the chamber, as in Fig. 3, the piston will be provided with holes therethrough (not shown) to allow movement of liquid through the by-pass assembly.

When employed for operation in a system where the pressure is intermittent, as in the brake system of an automotive vehicle, the spring pressed piston and stem normally urge the ball valve 49 into seating engagement with the valve seat 45 adjacent the entrance to the ball valve chamber. In response to the building up of pressure on the upstream side of the system, such as occurs upon the application of pressure to the brake pedal, the ball valve is unseated, thereby allowing the developed pressure to be transmitted to the downstream side of the system and against the main valve 23 and main piston 19 to unseat the main valve and expose the downstream side of the system to the direct and full pressure of the upstream side by way of the main valve housing 5.

Should a break occur in the downstream side of the system at this point in the operation thereof, that is while the full pressure is being transmitted to the downstream side of the system, a sudden drop in pressure will occur, as described in connection with the operation of the embodiment of Fig. 1, and the main valve 23 will accordingly snap to its closed position. Sudden loss in pressure also develops a considerable differential pressure across the ball valve 49, causing the same to be urged forward into seating engagement with the valve seat 47 adjacent the exit from the check valve chamber. This differential pressure will exist as long as the pressure is developed on the upstream side of the system, and so long as such differential pressure exists, the ball check valve will remain seated against the valve seat 47 and block off the exit from the ball valve chamber. Thus, neither fluid nor fluid pressure can be transmitted from the upstream side to the downstream side of the system under these conditions.

As was previously mentioned, my improved valve assembly is not limited in its application to systems where the pressure may be intermittently applied, but is also applicable to systems wherein a continuous pressure is maintained. In those systems, the conditions to which my improved valve assembly is exposed are somewhat analogous to the conditions existing in the intermittent type of system during those periods when the pressure is applied in such system. The valve 23 is held open so long as the desired pressure exists throughout the system and in the embodiment where the ball check valve by-pass assembly 35 is utilized in place of a pilot opening 31, the ball valve 49 may either float against the pressure of the spring 51 or the spring may be sufficiently weak to permit the ball valve to seat against the exit opening of the ball valve housing. Should a break occur on the downstream side of the system, the loss of pressure will immediately cause the main valve 23 to seat itself, and where the ball valve by-pass assembly is employed, the ball valve 49 will block off the exit opening from the ball valve chamber. Thus, the downstream side of this portion of the system will be effectively isolated from and therefore will not affect the rest of the system.

In the continuous pressure type system, the main valve spring 27 is preferably so designed as to close off the main valve only after a predetermined drop of pressure occurs on the downstream side of the system. Thus, momentary surges of small value will be ignored by the improved valve assembly of my invention, and should any heavy fluctuations occur, of a value sufficient to operate the main valve 23 and cause it to close, the ball valve 49 will function to permit the main valve to restore itself to open position. Such operation is apparent from my previous analysis of this embodiment of my invention. In this connection also, it would be advantageous to form the discharge end 9 of the housing as a Venturi section in order that the reduction of pressure at the point of entrance to the axial bore 29 in the valve stem may be better determined with relation to the velocity through this section, due to leakage.

The ball valve may or may not have considerable clearance to the wall of the ball valve chamber. In connection with its application to continuous pressure systems, such clearance would be advantageous in allowing a gradual build-up of pressure when placing such systems in operation.

While I have described two embodiments of my invention in considerable detail, it is however to be understood that my invention is applicable to other apparatus, and that I do not limit myself in any way, to the apparatus of the present application, as I may adopt various other apparatus embodiments within the scope of the appended claims.

I claim:

1. A check valve assembly for use in a hydraulic system or the like comprising a housing having an inlet opening and a discharge opening, said housing at the discharge opening being shaped to provide a valve seat, a cylinder supported in said housing in spaced relationship to the interior walls thereof by a plurality of supporting webs, said webs permitting continued free communication between said inlet and discharge openings of said housing, a piston in said cylinder having a stem extending toward said valve seat and carrying a valve adjacent said valve seat, said stem having an axial bore therein extending from the valve end of said stem and communicating with the interior of said cylinder behind said piston, a by-pass passage around said valve when in its seated position, and a compression spring in said cylinder between an end thereof and the front of said piston, urging said valve toward said valve seat.

2. A check valve assembly for use in a hydraulic system or the like comprising a housing having an inlet opening at one end and a discharge opening at the opposite end, said opposite end being shaped to provide a valve seat, a cylinder supported in said housing in spaced relationship to the interior walls thereof by a plurality of supporting webs, said webs permitting continued free communication between said inlet and discharge openings of said housing, a piston in said cylinder having a stem terminating at its end in a valve adjacent said valve seat, said stem having an axial bore therein extending from the valve end of said stem and communicating with the interior of said cylinder behind said piston, a pilot opening by-passing said valve when in its seated position, and a compression spring in said cylinder between an end thereof and the front of said piston, urging said valve toward said valve seat.

3. A check valve assembly for use in a hydraulic system or the like comprising a housing having an inlet opening at one end and a discharge opening at the opposite end, said opposite end being shaped to provide a valve seat, a cylinder supported in said housing in spaced relationship to the interior walls thereof by a plurality of supporting webs, said webs permitting continued free communication between said inlet and discharge openings of said housing, one of said webs having a breather passage therethrough connecting the interior of said cylinder with the external atmosphere, a piston in said cylinder having a stem terminating at its end in a valve adjacent said valve seat, said stem having an axial bore therein extending from the valve end of said stem and communicating with the interior of said cylinder behind said piston, a pilot opening by-passing said valve, and a spring in said cylinder between an end thereof and the front of said piston.

4. A check valve assembly for use in a hydraulic system or the like comprising a housing having an inlet opening and a discharge opening, said housing at the discharge opening being shaped to provide a valve seat, a cylinder supported in said housing in spaced relationship to the interior walls thereof by a plurality of supporting webs, said webs permitting continued free communication between said inlet and discharge openings of said housing, a piston in said cylinder having a stem terminating at its end in a valve adjacent said valve seat, said stem having an axial bore therein extending from the valve end of said stem and communicating with the interior of said cylinder behind said piston, a ball valve assembly by-passing said valve when in its seated position, and a spring in said cylinder between an end thereof and the front of said piston.

5. A check valve assembly for use in a hydraulic system or the like comprising a housing having an inlet opening and discharge opening, said housing at one end being shaped to provide a valve seat, a cylinder, means supporting said cylinder within said housing leaving a passage through said housing to provide substantially free communication between said inlet opening and said discharge opening, a piston in said cylinder having a stem extending toward said valve seat and carrying a valve adjacent said valve seat, said stem having a longitudinal bore communicating at one end with the interior of said cylinder and extending through said valve at its other end, and spring means in pressure engagement with said piston.

DONALD D. DUTTER.